June 16, 1953  L. J. MELLERT  2,641,952
MOTION-PICTURE CAMERA LENS ATTACHMENT
Filed Sept. 26, 1950
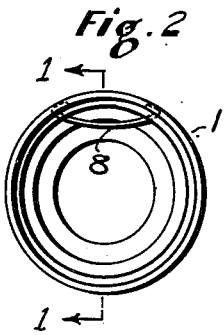
Fig. 2
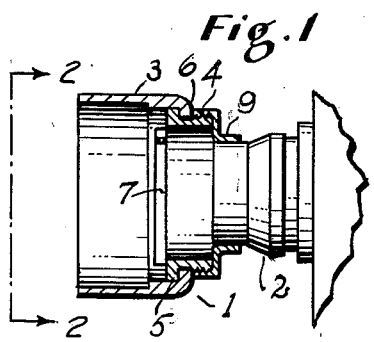
Fig. 1
Fig. 4
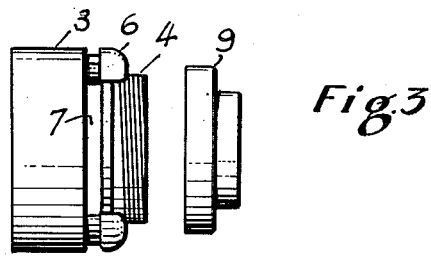
Fig. 3
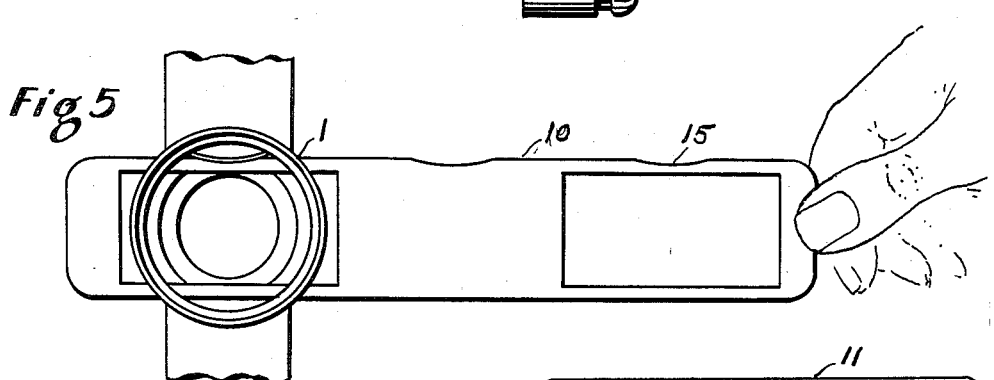
Fig. 5
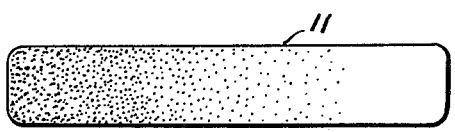
Fig. 8
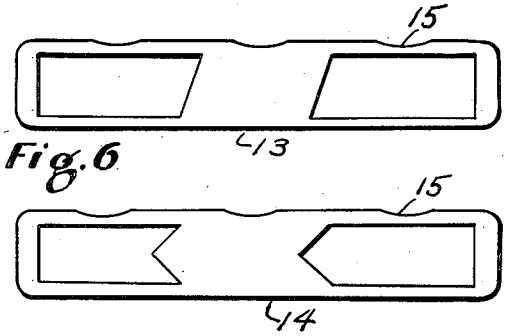
Fig. 6
Fig. 7
Fig. 9
INVENTOR.
Lawrence J Mellert
BY Bates, Teare & McBean
Attorneys Patented June 16, 1953

2,641,952

UNITED STATES PATENT OFFICE 2,641,952

MOTION-PICTURE CAMERA LENS ATTACHMENT

Lawrence J. Mellert, Atlanta, Ga.

Application September 26, 1950, Serial No. 186,776

2 Claims. (Cl. 88—1)

This invention relates to motion picture cameras, and more particularly to improved means for producing dissolve, fade and montage effects and the like in such cameras.

Various types of mechanisms and devices have heretofore been proposed in connection with motion picture cameras for producing varied effects such as dissolving, fading-in and fading-out scenes and montage or titling effects. These devices, however, are usually constructed as an inherent part or mechanism of the motion picture camera and most often embody intricate lever or other operating mechanisms which are associated with the camera operating mechanism. The coaction of the devices with the camera mechanism results in many tricks in scene changing and fading and in providing various forms of composite pictures which are unique in form and pleasing to a camera audience.

In view of the intricate complicated form of some of the mechanisms, the cost of, and the knowledge and training required to operate such camera equipment effectively, the trick effects hereinabove suggested have been largely the stock and trade of professional cameramen. However, the increasing use of less expensive and simpler camera equipment by amateurs who wish to approach camera techniques in their own cinematographic field has given rise to a need for providing simple and inexpensive auxiliary equipment in the form of various attachments and the like, which may be standardized for functional use in this field. By reason of such attachments, many so-called tricks of the professional camera can be duplicated by the amateur with a camera which is rarely equipped to do anything but shoot fullframe ordinary picture shots one after the other with a steady monotony which has become uninteresting and dull compared to what is expected of amateur movies in their continued growth.

Accordingly it is an object of this invention to provide a simple attachment for a motion picture camera lens which will enable the operator to attain varied effects of dissolve, fade, and montage.

Another object of this invention is to provide a simple attachment for a camera lens which will in addition to enabling the attainment of varied motion picture effects also act as a filter holder and sunshade for the camera lens.

A further object of this invention is to provide a simple, reliable and altogether dependable attachment for producing varied cinematographic effects, which attachment may be employed with any type camera, and which requires no attention in the construction of the camera or changes in or connections to the usual mechanism of the camera.

Briefly, in accordance with this invention, the preferred embodiment of a motion picture camera attachment for producing varied cinematographic effects is in the form of a hollow shield having means associated therewith for attaching the shield to the lens barrel or mount of a camera and having means for receiving various forms of slide members adapted for rectilinear motion across the face of the camera lens.

These and other objects and advantages of the invention will be further understood from the following description when considered in connection with the accompanying drawings and in the scope as pointed out in the appended claims.

In the drawings, Fig. 1 is a side view showing the device of the invention in cross section attached to a motion picture camera lens barrel or mount; Fig. 2 is an end view of the device of Fig. 1; Fig. 3 is a side view of the device of Fig. 1 showing the slide holder separated from the connecting adapter; Fig. 4 is a view of the spring member carried by the slide holder; Fig. 5 shows how a mask slide member may be inserted in the slide holder for rectilinear motion across the camera lens; Figs. 6 and 7 show different forms of mask slide members which may be used with the slide holder of the invention; Fig. 8 shows a colored slide member with the color becoming progressively denser towards one end of the slide member; and Fig. 9 shows another type slide member which carries various designs in outline for montage effects.

Referring now to Fig. 1, a slide holder 1 is shown attached to a motion picture camera lens barrel or mount 2. The slide holder attachment 1 is in the form of a hollow cylindrical member which is preferably composed of two cylindrical sections 3 and 4. The two cylindrical sections 3 and 4 are adapted to cooperate in a telescopic manner as shown in Figs. 1 and 3.

The hollow cylindrical member 4 is of smaller diameter than the member 3 and has on one end a laterally extending flange 5 which extends outwardly from the entire periphery of one end of the member 4. The member 3 also has a flange 6 at one end thereof which extends inwardly to form an opening of smaller diameter at one end of the member 3. The flange 6 on the member 3 is in the form of a partial flange depending from diametrically opposed sides on the end of the member 3. In assembling the slide holder, the member 4 is telescopically inserted in the member 3 and the laterally extending flange 5 on the member 4 cooperates with the partial inwardly extending flanges 6 on the member 3 in a manner to restrain axial movement of the member 4 with respect to the member 3 in one direction.

It will be noted that the partial flanges 6 on the member 3 are in the form of projections, extending axially from the end of the member 3 a greater distance than the thickness of the flange 5 on the member 4. Thus, when the members 3 and 4 are telescopically assembled in their extreme axial position there is a space or opening 7 formed between the flange end of the member 4 and the non-flanged portions on the end of the member 3.

Referring now to Fig. 2, a spring member 8, which is shown in Fig. 4 as being in the form of a strap or link having its ends hooked inwardly, is mounted within the large member 3 in the space between the members 3 and 4 previously described so that the hooked ends may extend through the space and clasp the outer surface on one of the partial flanges 6 of the member 3. The intermediate portion of the spring member 8 between the hooked ends thus forms a straight line or chord in the space between the members 3 and 4 which is transverse to the cylindrical axis formed by the telescoping members 3 and 4. The arrangement of the spring member 8 in this manner serves a two-fold purpose. The intermediate portion of the spring member 8 acts as a spring lock to position slide members within the slide holder as will be hereinafter more fully described.

Referring now to Fig. 3 where like numerals designate like parts, it will be seen that the smaller cylindrical member 4 is threaded upon the end opposite from that of the flange in order to receive the connector or adapter in threaded engagement thereon. The adapter 9 may be either threaded or bayonet equipped so that it can be screwed on or slipped over the motion picture camera lens barrel and can be made in various sizes to accommodate different types and size lenses. It will be readily apparent that the slide holder could be designed for mounting on a lens barrel or mount on a motion picture camera without the necessity or need for an associated or intermediate adapter connector member. However, inasmuch as one of the principal objects of this invention is to provide a simple attachment for any type or size of camera it is deemed expedient to provide a standardized size or type of slide holder which may be purchased with different sizes of adapters so that the slide holder may be adapted for use with various types of motion picture cameras. The slide holder adapter is shown assembled and mounted on the lense barrel or mount in Fig. 1.

Referring now to Fig. 5, where like numerals designate like parts, a front view of a motion picture camera and slide holder attachment is shown receiving a slide member 10 of the masking type in the space between the members 3 and 4. The slide member may be manually moved in a rectilinear manner across the face of the motion picture camera lens in either direction and various forms and types of slide members may be used to attain different and varied effects as will be hereinafter more fully described.

The slide holder attachment may be used in conjunction with various types of slide members to dissolve scenes as the motion picture progresses, or may be used to fade-in or fade-out scenes as desired, or may be used to provide composite forms of pictures and montage effects depending upon the type of slide member used.

For example, a picture dissolve may be accomplished by first effecting a fade-out by slowly pushing a colored slide 11 of the type shown in Fig. 8 through the slide holder after the manner described in connection with Fig. 5. The colored slide member 11 shown in Fig. 8 may be made of transparent Lucite or clear glass which is processed from a clear to an opaque colored transmission medium. The processing may be obtained in any well-known manner by dyeing or by spraying gelation on the surface of the slide member. By way of example the colored slide member of Fig. 8 has been processed so as to provide a progressively opaque transmission medium in color from one end of the slide to the other.

It is, of course, possible and may be desirable to obtain a completely opaque area on the slide member for masking purposes, and we have found that in order to obtain such a completely opaque area it is desirable to first dye the slide member in black by dipping and slowly drawing the slide from the dye, thereby avoiding hard abrupt lines of demarkation. The progressive opaqueness of the slide member may be obtained in a like manner when color dyeing the slide member by dipping and slowly drawing the slide member from the dye in such manner that one end becomes more opaque than another, thereby eliminating any sudden disappearing color or shadow effect on the film or scene.

Having first manually inserted the colored slide member 11 through the slide holder in the manner described in connection with Fig. 5 so that the opaque end of the slide is before the camera lens, the dissolve may be further effected by then reversing the film to the start of the first action. The slide may then be withdrawn and reinserted with the opaque end first and pushed through so that the clear end of the slide member is before the camera lens. Such dissolves can be enhanced on color film by using several colors, one for the fade-out, and another for the fading in of the next scene. Other varied effects may be obtained by overlapping several colors to give a changing color effect, which effects are limited only by the combination of sympathetic or clashing colors. In this manner the entire spectrum may be explored to determine the most desirable effects for a given type dissolve.

A highly professional fade-out may be obtained when using the color slide members with colored films by simply inserting the colored slide member desired and pushing it through the slide holder while the camera is in motion. Various unusual and novel color effects may be attained in this manner. For example, a forest scene can be completely blended out of the scene by use of a green slide. Similarly, a fire scene can be blended out by using a red slide, and water scenes by using blue slides. Motion pictures of sunsets can be augmented in a highly desirable manner by using red or amber slides.

In addition to the dissolve and fade-out scene effects, it is also possible with the slide holder of this invention to obtain various composite picture or montage effects by using the all-clear slide member 12 shown in Fig. 9. The slide member 12 of Fig. 9 may also be of transparent Lucite, glass, or similar material on which is inked or etched various figures or designs in outline. Then, by placing the slide member 12 in the holder and aligning the outlined figure desired squarely in front of the camera lens and then shooting or taking a scene through this outlined figure, it is possible to obtain a scene having a softly outlined image of the figure or design superimposed thereon, creating a montage or composite picture effect.

As previously suggested, the slide members can be used for masking purposes or for what is commonly known as wipes by making the transparent slide member completely opaque in the manner previously described, or by using a solid material such as aluminum or opaque plastic for the slide member. Thus, while the motion picture film is in motion, the wipe slide, or masking slide member, may be pushed through the slide holder so that the opaque or solid portion of the slide member entirely covers or masks the camera lens. The camera may then be stopped at this point and reversed until the film is at the starting position of the immediate action, and the masking member or wipe slide is then pushed through the slide holder to remove the masking or covering portion from the camera lens.

It is possible, with careful calculation in film footage and a few attempts by the operator, to obtain a wipe which amounts to nothing more than a very narrow hazy line which appears to travel across the screen upon which the scene is projected so that action is going on on both sides of the line as it travels across the screen Actually, of course, the camera operator is photographing a small section of film double with the wipe slide acting as a mask. Various forms of masking slide members or wipes may be used, depending on the type of moving line desired across the screen. Several embodiments are shown at 13 and 14 in Figs. 6 and 7 of the drawings.

It will be noted in the drawings, Figs. 5 through 9, that the slide members have slight indentations or notches 15 on the top edge. As previously pointed out, the spring member 8 acts as a spring lock for the slide members to hold them in their respective desired positions. Thus, referring again to Fig. 5, a masking member may be inserted in the slide holder so that the lens is uncovered or unmasked. This portion of the slide member may be centrally located with respect to the camera lens by virtue of the notch 15 in the top of the slide member which cooperates with the spring member 8.

The spring member 8 should be flexible enough to allow the slide members to travel in a rectilinear manner steadily across the face of the camera lens and yet have sufficient resistance to hold the slides in the indentations or grooves in order to restrain lateral movement and to prevent the slide member from moving out of position during the shooting of a scene. This is particularly applicable to the slide member shown in Fig. 9 which is used for montage effects. As shown in Fig. 9, there is a notch or indentation at the top of the slide member for every design or diagram which is drawn or etched on the slide member, thereby enabling the central positioning of each of the designs with respect to the camera lens as desired.

The slide holder of this invention, in addition to providing the varied effects hereinbefore described, has also been designed to provide additional advantages desired by a camera operator. For example, referring again to Fig. 1, it will be noted that the large section 3 of the slide holder telescopically extends a considerable distance beyond the face of the camera lens. This extension has been deliberately designed to provide a sunshade for the camera lens and of course can be allowed to remain on the camera without the use of slide members.

A further purpose and advantage of the attachment of this invention resides in the fact that the slide holder may also be considered a conventional filter holder. Thus, referring again to Figs. 1 and 3, the adapter 9 of the slide holder is designed to allow the insertion of filters for black and white film, or color correctioned filters therein. The filter, of course, is retained between the inner flange face of the adapter 9 and the threaded end of the slide holder member 4. In this respect the adapter 9 may be constructed not only for an adaptation of the slide holder to various types and sizes of cameras, but also may be designed and constructed so as to hold various sizes and types of filters within the threaded flange.

Thus, the simple attachment of this invention serves a three-fold purpose in that it acts as a slide holder for producing various cinematographic effects such as color dissolves, scene fadeouts, and montage or composite scenes, and may also be used as a sunshade and as a conventional type filter holder. The attachment can be used with a camera which carries black and white film or colored film, depending on the type of scenic effects or corrections desired, and it may be applied to any of the well-known 8 mm., 16 mm. or 35 mm. motion picture cameras which are in common use.

I have shown and described what I consider the preferred embodiment of my invention along with similar modified forms, and it will be obvious to those skilled in the art that other changes and modifications, particularly with respect to the shape and structure of the slide holder and the material and construction of the slide members and their manner of coaction with the slide holder, may be made without departing from the scope of my invention as defined by the appended claims.

I claim:

1. A camera attachment comprising, a plurality of cooperatively telescoping hollow members, one of said members having a flange extending laterally from one end thereof, the other of said members having diametrically opposite spaced cut-a-way portions on one end thereby leaving portions of the hollow member between the cut-a-way portions and projecting beyond said cut-a-way portions, said projecting portions having their extremities turned inwardly toward each other to form depending flanges, the flanges of said respective hollow members interlocking to limit extended axial movement of said members beyond a predetermined extended position, the flange on said one member being spaced from the adjacent edges of the cut-a-way portions on said other member in such predetermined extended position to form a transverse aperture for receiving a slide member therethrough, an annular adaptor adapted to telescope at one end over the other end of said one member and having a tubular extension at its other end adapted to telescope over a camera lens barrel, and means coacting between the corresponding telescoping ends of the adaptor and of said one member for axially positioning the adaptor thereon and against the depending flanges of said other member to secure the members in their predetermined extended position.

2. A camera attachment comprising, a plurality of cooperatively telescoping hollow members, one of said members having a flange extending laterally outwardly from one end thereof, the other of said members having diametrically opposite spaced cut-a-way portions on one end leaving portions of the hollow member between the cut-a-way portions and projecting beyond said cut-a-way portions, said projecting portions having their extremities turned inwardly toward each other to form depending flanges, the flanges of said respective hollow members interlocking to limit extended axial movement of said members beyond a predetermined extended position, the lateral flange on said one member being spaced from the adjacent edges of the cut-a-way portions of said other member in such predetermined extended position to form a transverse aperture for receiving a slide member therethrough, an annular adaptor adapted to telescope at one end over the other end of said one member and having a tubular extension at its other end adapted to telescope over a camera lens barrel, means coacting between the corresponding telescoping ends of the adaptor and of said one member for axially positioning the adaptor thereon and against the depending flanges on said other member to secure the members in their predetermined extended position, a spring clip having an intermediate portion with inturned ends adapted to clamp about opposite sides of one of the projecting portions on said other member in the transverse aperture formed between said members in their predetermined extended position, the intermediate portion of said spring clip extending through said aperture and forming a transverse cord across the line of sight through the telescoping members adapted to resiliently engage a slide member in the transverse aperture for selective positioning therein.

LAWRENCE J. MELLERT.

References Cited in the file of this patent

UNITED STATES PATENTS

| Number | Name | Date |
|---|---|---|
| 445,561 | Knox | Feb. 3, 1891 |
| 681,003 | Seed | Aug. 20, 1901 |
| 737,600 | Fair | Sept. 1, 1903 |
| 988,710 | Holbrook | Apr. 4, 1911 |
| 1,144,108 | Buttner et al. | June 22, 1915 |
| 1,572,315 | Scholl | Feb. 9, 1926 |
| 1,626,841 | Kelley et al. | May 3, 1927 |
| 1,829,867 | Koster | Nov. 3, 1931 |
| 1,848,879 | Halbasch | Mar. 8, 1932 |
| 1,934,310 | Hulburt et al. | Nov. 7, 1933 |
| 1,949,067 | Wheelock et al. | Feb. 27, 1934 |
| 1,966,149 | Stevens | July 10, 1934 |
| 2,088,710 | Lewis | Aug. 3, 1937 |
| 2,193,333 | Heward | Mar. 12, 1940 |
| 2,241,596 | Guhl | May 13, 1941 |
| 2,331,027 | Harrison | Oct. 5, 1943 |
| 2,502,609 | Suppiny | Apr. 4, 1950 |
| 2,523,067 | Sherry | Sept. 19, 1950 |

FOREIGN PATENTS

| Number | Country | Date |
|---|---|---|
| 371,274 | Germany | Mar. 13, 1923 |